United States Patent
Paulick (12)

(10) Patent No.: US 6,471,820 B1
(45) Date of Patent: *Oct. 29, 2002

(54) MOISTURE-CURABLE SILICONE COMPOSITION

(75) Inventor: Leora M. Paulick, Oakdale, MN (US)

(73) Assignee: 3M Innovative Properties, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/368,875

(22) Filed: Jan. 5, 1995

(51) Int. Cl.$^7$ .................................................. C09J 5/10
(52) U.S. Cl. ..................... 156/306.9; 156/329; 524/492; 524/588
(58) Field of Search ............................. 156/306.9, 329; 524/492, 588

(56) References Cited

U.S. PATENT DOCUMENTS

| | | | |
|---|---|---|---|
| 3,767,503 A | * 10/1973 | Maddalena | ................. 156/295 |
| 4,191,817 A | 3/1980 | Schiller | |
| 4,453,997 A | * 6/1984 | Hori et al. | ................ 156/306.9 |
| 4,832,349 A | 5/1989 | Kawai et al. | |
| 4,888,380 A | * 12/1989 | Kamis et al. | ................ 524/588 |
| 5,013,781 A | * 5/1991 | Koshii et al. | |

FOREIGN PATENT DOCUMENTS

| | | |
|---|---|---|
| EP | 0 117 772 | 9/1984 |
| EP | 0 188 285 | 7/1986 |
| EP | 0 409 079 A2 | 1/1991 |
| EP | 0 497 318 | 8/1992 |
| FR | 2264846 | 10/1975 |
| WO | WO 91/10851 | 7/1991 |

OTHER PUBLICATIONS

Gore–Tex Literature (undated).
Aranguren et al., *J. Rheol.* 36(6):1165 (1992).

* cited by examiner

*Primary Examiner*—John J. Gallagher
(74) *Attorney, Agent, or Firm*—Scott R. Pribnow

(57) ABSTRACT

Moisture-curable silicone sealing compositions that are tacky and self-supporting at room temperature prior to cure. When measured at 25°±1° C. at a frequency of 0.1 rad/sec, the compositions have a storage shear modulus of at least 9.0 KPa, a loss shear modulus of at least 4.0 KPa, and a viscosity of at least 98.5 KPa Sec.

17 Claims, No Drawings

MOISTURE-CURABLE SILICONE COMPOSITION

BACKGROUND OF THE INVENTION

1. Field of the Invention

This invention relates to moisture-curable silicone compositions, and methods for preparing such compositions.

2. Description of the Related Art

Moisture-curable silicone sealants in the form of thixotropic pastes are known. The user generally applies the paste by extruding it from a tube, aerosol can, caulking cartridge, or automatic pumping equipment onto a surface to be sealed and/or mated. One problem with such pastes is that they are messy and difficult to apply reliably and accurately. In addition, once applied the paste can be readily dislodged. The paste must also be allowed to "skin over" or "set up" once applied, necessitating a waiting period between the time the sealant is applied and the time the object to which the paste is applied can be used.

Solid sealant strips made of Gore-Tex® microporous polytetrafluoroethylene are also known. Such strips create a seal by conforming to surface imperfections and filling gaps between mating surfaces, rather than adhering to the surface. The inability of such strips to adhere to the surface, coupled with a relatively low compression set resistance, creates a tendency for the seal to fail when the mated surfaces move relative to each other. In addition, these strips do not have sufficient adhesive strength to seal over a hole or gap in a surface.

SUMMARY OF THE INVENTION

In a first aspect, the invention features a moisture-curable silicone sealing composition having a storage shear modulus of at least 9.0 KPa and a loss shear modulus of at least 4.0 KPa prior to curing when measured at 25°±1° C. at a frequency of 0.1 rad/sec. Unlike thixotropic pastes and solid sealant strips, the composition is tacky and self-supporting at room temperature prior to curing. Preferably, the composition further exhibits a storage shear modulus of at least 80 KPa and a loss shear modulus of at least 50 KPa prior to curing when measured at 25°±1° C. at a frequency of 100 rad/sec.

In a second aspect, the invention features a moisture-curable silicone sealing composition having a viscosity of at least 98.5 KPa Sec prior to curing when measured at 25°±1° C. at a frequency of 0.1 rad/sec. Unlike thixotropic pastes and solid sealant strips, the composition is tacky and self-supporting at room temperature prior to curing. Preferably, the composition further exhibits a viscosity of at least 940 Pa Sec prior to curing when measured at 25°±1° C. at a frequency of 100 rad/sec prior to curing.

In preferred embodiments of both aspects, the sealing composition is in the form of a ribbon, rope, or sheet. The sealing composition preferably has an elongation value of about 200 to about 1200% (preferably about 350 to about 600%) after curing.

Preferred compositions include a hydroxy-terminated polydialkylsiloxane, fumed silica, and a silane crosslinking agent. The polydialkylsiloxane preferably is present in an amount ranging from about 35 to about 85% by wt. (more preferably from about 65 to about 75% by wt.). The fumed silica preferably is present in an amount ranging from about 5 to about 30% by wt. (more preferably from about 20 to about 25% by wt.), and has a surface area of at least 50 $m^2/g$ (preferably ranging from about 130 $m^2/g$ to about 400 $m^2/g$). The silane is preferably present in an amount ranging from about 1 to about 15% by wt. (more preferably from about 2.5 to about 6% by wt.). The sealing composition is preferably essentially free of curing catalysts.

The invention further features methods of sealing two surfaces together by applying the above-described sealing compositions to the first surface, and then contacting the first surface with the second surface in the presence of moisture to bond the two surfaces together.

Throughout this application the following definitions apply:

A "tacky" composition is a composition which passes the Tack Test described infra under Test Procedure D.

A "self-supporting" composition is a composition which passes the Stretch Test described infra under Test Procedure C.

The invention provides tacky, self-supporting sealing compositions which (unlike thixotropic pastes) can be readily and accurately applied by hand because they do not transfer to any substantial extent to the user's hands. Because the sealing compositions are self-supporting, they can be provided, e.g., in the form of ropes, ribbons, or sheets stored in laminated packages and conveniently dispensed simply by lifting the rope, ribbon, or sheet out of the package. The compositions can then be formed by hand into a variety of shapes to seal a number of mating surfaces. In addition, the sealing compositions are functional upon application; there is no substantial set-up time following application. The invention thus combines the ease of handling associated with solid sealant strips with the sealing behavior of curable thixotropic pastes.

Other features and advantages of the invention will be apparent from the following description of the preferred embodiments thereof, and from the claims.

DESCRIPTION OF THE PREFERRED EMBODIMENTS

Preferred silicone sealant compositions according to the invention contain (a) 35–85% by wt. of a hydroxy-terminated polydialkylsiloxane; (b) 5–30% by wt. fumed silica; and (c) 1–15% by wt. of a silane crosslinking agent. The particular amounts of ingredients, and the conditions under which they are processed, are selected such that the uncured composition is tacky and self-supporting (and thus readily handled, particularly when provided in the form of a ribbon, rope, or sheet). In general, it is desired that the composition be tacky enough to adhere to a clean metal substrate, yet not be so tacky that it transfers to the user's hands. Similarly, the composition must have sufficient integrity to retain its shape, but must not be so stiff that it cannot be easily formed by hand into the shape needed for a-particular application.

The viscosity and storage and loss shear moduli of the sealing composition measured at low (0.1 rad/sec) frequency according to Test Procedure A provide a quantitative measure of the "handlability" of the sealing composition. It is generally preferred that the composition exhibit a viscosity of at least 98.5 KPa Sec at 0.1 rad/sec, and a storage shear modulus of at least 9.0 KPa and a loss shear modulus of at least 4.0 KPa at 0.1 rad/sec.

The viscosity and complex shear modulus of the sealing composition measured at high (100 rad/sec) frequency according to Test Procedure A provide a quantitative measure of the "processability" of the sealing composition. It is generally preferred that the composition exhibit a viscosity of at least 940 Pa Sec at 100 rad/sec, and a storage shear modulus of at least 80 KPa and a loss shear modulus of at least 50 KPa at 100 rad/sec.

Any of the hydroxy-terminated polydialkylsiloxanes typically used in known sealing compositions may be used in the sealing compositions according to the invention. One class of preferred materials includes polydialkylsiloxanes having viscosities at 25° C. ranging from about 0.08 $m^2/s$ to about 0.3 $m^2/s$. Examples of commercially available polydialkylsiloxanes failing within this class include those available from PPG Industries, Inc. under the designations Masil SFR 80,000, SFR 150,000, and SFR 300,000, and those available from Huls America of Piscataway, N.J. under the designation PS348.7. Hydroxy-terminated polydialkylsiloxanes having lower viscosities may also be used if the viscosity of the polymer is increased in situ during processing.

Fumed silicas having relatively high surface areas (e.g., in the range 50–400 $m^2/g$) are generally preferred. Such silicas are commercially available from Cabot Corp. of Tuscola, Ill. under the trade designations L-90, LM-130, LM-150, MD-7, MS-55, MS-75D, H5, M5, HS-5, EH-5, TS720, TS530, and TS610, and from Degussa Corp. of Dublin, Ohio under the trade designations Aerosil 90, 130, 150, 200, 300, 380, R202, R810, R811, R812, R975, R976, R972, and R974.

Particularly preferred are hydrophobic fumed silicas (i.e., fumed silicas provided with a hydrophobic coating). Such silicas have a reduced tendency to adsorb moisture, and thus introduce less moisture into the composition, compared to silicas lacking a hydrophobic treatment; exposure to moisture is undesirable because it initiates premature cure. Also preferred are densified fumed silicas. Such silicas facilitate compounding and processing because they are relatively easy to handle. Examples of densified fumed silicas (both of which are commercially available from Degussa Corp.) include R974V (having a bulk density of 120 g/l and a surface area of 170 $m^2/g$) and R972V (a hydrophobic fumed silica having a bulk density o 120 g/l and a surface area of 110 $m^2/g$).

Suitable silane crosslinking agents generally have the formula $R_nSiY_{4-n}$ where R is a monovalent hydrocarbon group (e.g., an alkyl, alkenyl, aryl, or alkaryl group);, n is 0, 1, or 2; and Y is a monovalent hetero-alkyl or aryl group such as a dialkylketoxamino group (e.g., methylethylketoxamino, dimethylketoxamino, or diethylketoxamino), alkoxy group (e.g., methoxy, ethoxy, or butoxy), alkenoxy group (e.g., isopropenoxy), acyl group (e.g., acetoxy), alkamido group (e.g., methylacetamido or ethylacetamido), or arylamido group (e.g., benzylamido). Silane crosslinldng agents falling within this category are commercially available, e.g., from Silar Laboratories of Scotia, N.Y. Particularly preferred silane crosslinking agents are dialkylketoaminosilanes because they exhibit good shelf-stability and do not form deleterious by-products upon cure. Examples include methyltris(methylethylketoxime) silane ("MOS") and vinyltris(methylethylketoxime) silane ("VOS"), both of which are commercially available from Allied-Signal, Inc. of Morristown, N.J., and alkoxysilanes available from OSI Chemicals of Lisle, Ill.

The sealing composition may also contain adhesion promoters, plasticizers, curing catalysts, and/or fillers. The amounts of these ingredients are selected such that the tacky, self-supporting nature of the sealing composition prior to cure is maintained.

Examples of suitable adhesion promoters include alkoxysilanes such as methyltrimethoxysilane, vinyltrimethoxysilane, gamma-glycidoxypropylmethyldiethoxysilane, and gamma-mercaptopropyltrimethoxysilane. Suitable commercially available adhesion promoters include alkoxysilanes commercially available from OSI Chemicals of Lisle, Ill. under the designations A1120, A1170, Y11343, Y11542, and Y11597.

Suitable plasticizers include polydialkyl siloxane oils which are not hydroxy-terminated and therefore do not react with the other ingredients in the sealing composition during cure. Such plasticizers typically have viscosities in the range of about 0.0007 to 0.06 $m^2/s$. Examples include siloxane oils commercially available from Huls America and the SF™ series of silicone oils available from PPG Industries, Inc.

Examples of suitable curing catalysts include alkyl tin derivatives (e.g., dibutyltindilaurate, dibutyltindiacetate, and dibutyltindioctooate commercially available as "T-series Catalysts" from Air Products and Chemicals, Inc. of Allentown, Pa.), and alkyl titanates (e.g., tetraisobutylorthotitanate, titanium acetylacetonate, and acetoacetic ester titanate commercially available from DuPont under the designation "TYZOR"). In general, however, it is preferred to select silane crosslinking agents that do not require the use of curing catalysts to avoid reducing shelf-life and adversely affecting the physical properties of the sealing composition.

Examples of suitable fillers include precipitated silica, silica aerogel, ground quartz, calcium carbonate, magnesium carbonate, kaolin and bentonite clays, talc, titanium dioxide, aluminum silicate, diatomaceous earth, ferric oxide, carbon black, zinc oxide, ceramic microspheres (e.g., microspheres commercially available from 3M Co. of St. Paul, Minn. under the designations Z Light Spheres™, Zeeosphere™, and Macrolite™ Ceramic Spheres), glass microbubbles, and fibrous fillers (e.g., glass and ceramic fibres).

Other ingredients which may be added to the sealing composition include dyes, fungicides, heat stabilizers, fire retardants, ultraviolet stabilizers, modifiers such as MQ siloxane resins commercially available from General Electric Co. and MDQ siloxane resins commercially available from Shin-Etsu of Osaka, Japan, and thixotropes (e.g., thixotropes commercially available from Rheox, Inc. of Hightstown, N.J. under the designation "Thiatrol™" and "Thixcin™"). Again, the amounts of these additional ingredients are selected such that the tacky, self-supporting nature of the sealing composition prior to cure is maintained.

The sealing composition is prepared by mixing the components together in a high shear mixing process using equipment having closed mixing chambers to prevent exposure to moisture (and thus premature cure). The goal of the mixing process is wet the fumed silica particles as uniformly as possible with the polydialkylsiloxane, and to uniformly disperse the other ingredients. The high shear rates used during mixing achieve this objective by breaking up silica agglomerates and aggregates, and dispersing the particles substantially uniformly throughout the mix.

The high shear mixing process may be carried in a variety of ways, including by means of a press-mixer (e.g., a Model 10L NK PRESSMXER available from J. M. Voith AG of St. Polten, Austria) or a co-rotating twin extruder (e.g., a TYPE MC 5-co-rotating, intermeshing twin screw extruder available from Welding Engineers, Inc. of Blue Bell, Pa. or a co-rotating, intermeshing twin screw extruder available from Teledyne Readco of York, Pa.). In the case of compositions prepared in the press-mixer, the order in which the various components are added is important. Specifically, it is preferred to add a substantial portion of the fumed silica to the polydialkylsiloxane before adding the remaining ingredients.

The invention will now be further described by way of the following examples.

EXAMPLES

Test Procedures

In tests A, C, D, and E, the uncured sealant composition was prepared in the form of a rope measuring approximately 30 cm long and 6 mm in diameter using a single screw extruder equipped with a 6 mm exit die. Following extrusion, the rope was heat-sealed in a foil pouch where it was stored until tested. Tests B, P, and G were performed on samples that had been cured for 3 days at 25° C./50% relative humidity prior to testing.

A. Shear Modulus and Viscosity

The reported storage G'(ω) and loss G"(ω) shear moduli were determined using a Rheometrics RDA II shear rheometer operated in the oscillatory mode. The RDA II rheometer (available from Rheometrics Inc.; Piscataway, N.J.) was equipped with 8 mm parallel plates surrounded with a temperature programmable oven equipped with an inert gas purge. The rheometer mechanical drive assembly, parallel plates and oven were enclosed in an acrylic plastic box which further isolated the test environment from fluctuations in laboratory temperature and humidity. The pouch containing the rope was opened under dry nitrogen purge, after which sufficient sealant to cover the rheometer plates was removed and placed on the rheometer base plate. The rheometer plates were engaged and the spacing between plates maintained in the range of 1.4–2.0 mm during measurement. The oven was not heated but was purged with 25±1° C. dry nitrogen to prevent cure of the samples during measurement. Measurements were made in a frequency range (ω) of from 0.1 to 100 radians per second. The strain amplitude was confined to the linear range for all measurements.

The viscosity was calculated from the storage and loss shear moduli using the following formula:

$$\text{viscosity } (\eta) = [G'(\omega)^2 + G''(\omega)^2]^{1/2}/\omega$$

B. Tensile Strength and Elongation

Uncured sealant was pressed into Teflon™ molds the size and shape of ASTM D-412, Die C, to produce a sample having a thickness of 2.0 mm. The test sample was then cured for 3 days at 25° C./50% relative humidity. The tensile strength and percent elongation of the cured test sample were then measured according to ASTM D-412.

C. Stretch

The foil pouch containing the rope was peeled open by pulling the top and bottom portions of the pouch apart to expose the entire length of rope. The sides of the bottom portion of the opened pouch were then taped to the surface of a table such that the entire interior of the pouch, as well as the rope, was exposed. Next, a 15 cm test section of rope was cut from the center of the 30 cm rope without removing the rope from the interior surface of the pouch. One end of the test section was then grasped between the user's thumb and forefinger, and slowly pulled free from the surface of the pouch at an angle of about 90° until the other end of the rope released from the pouch such that the entire test section was suspended vertically above the opened pouch. The total pull time was about 3 seconds. The length of the test section was then measured and the stretch recorded as the extent to which the length exceeded the original 15 cm. A sample was said to pass the stretch test if the stretch was no greater than about 50 mm.

D. Tack

The pouch containing the rope was opened and a 15 cm section of the rope was then cut and laid gently in a substantially circular loop on the surface of a cold rolled steel test panel measuring 10 cm×15 cm (available from ACT of Hillsdale, Mich.) which had previously been wiped clean with toluene. Care was taken not to press the rope into the surface of the steel test panel. The panel was then inverted and the amount of time that elapsed before the loop fell off the test panel was measured. A composition was said to pass the tack test if it did not fall off the test panel after a period of 30 seconds.

E. End Seal

The pouch containing the rope was opened and a 15 cm section of the rope was then cut and laid gently in a substantially circular loop on the surface of a cold rolled steel test panel measuring 10 cm×15 cm (available from ACT of Hillsdale, Mich.) which had previously been wiped clean with toluene. Care was taken not to press the rope into the surface of the steel test panel. The ends of the loop were lifted from the steel panel and overlapped with each other to create an overlap joint measuring approximately 3 mm. The overlap joint thus created was then pressed back onto the steel surface using moderate thumb pressure. Next, the loop was lifted from the surface of the steel panel by grasping two portions of the loop located on opposite sides of the loop about 5 cm from the overlap joint. A sample was said to pass the end seal test if the joint did not pull apart during the lifting process.

F. Shear Adhesion

Unpolished, cold rolled steel strips measuring 76 mm×25 mm×1 mm were cut from panels commercially available from ACT of Hillsdale, Mich. Sealant was applied full-width to the end of a test strip. Bond thickness was controlled to 500 micrometers by placing wire segments of appropriate diameter in the sealant. The end of a second steel strip was placed over the sealant, and the extent of strip overlap adjusted to 12.7 mm using a ruler. Excess sealant was removed from the bonded test strips, leaving an adhesively bonded region between the strips measuring 25 mm×12.7 mm×0.5 mm. The test specimens thus produced were then cured for 3 days at 25° C./50% relative humidity. Following cure, the tab ends of the test specimens were clamped in the jaws of a Sintech 6W tensile test system (available from MTS Systems Corp. of Research Triangle Park, N.C.), and the specimens were pulled at a cross-head speed of 5 cm/min. The shear adhesion at break was recorded.

G. Durometer

Uncured sealant was cast in rectangular Teflon™ molds to produce test samples measuring 50 mm×25 mm×2 mm. The test samples were then cured for 3 days at 25°/50% relative humidity, after which the durometer (Shore A hardness) of the cured samples (stacked three together) was measured according to ASTM D-2240.

EXAMPLE 1

1775 g of hydroxy-terminated polydimethylsiloxane (Masil SFR 150,000 hydroxy-terminated polydimethylsiloxane polymer available from PPG Industries, Inc. having a viscosity of 150,000 centistokes) was charged to the mixing chamber of a model 10L NK PRESSMIXER manufactured by Neulinger-Kreuziger. 400 g of fumed silica (Cabosil TS610 hydrophobic fumed silica from Cabot Corp.) was then added to the polydimethylsiloxane polymer in two separate 200 g charges.

The first silica charge was mixed into the polydimethylsiloxane polymer using a 3 minute mix cycle in which the mixing blade (rotating at 50 rpm) was moved axially through the entire volume of the mixing chamber to wet out the silica. The second silica charge was then added using a 5 minute mix cycle, after which vacuum was applied in excess of 600 mm of Hg to remove entrained air while mixing continued for an additional 10 minutes.

Following mixing, the fumed silica was dispersed throughout the composition using three pressurized dispersing cycles. Each cycle commenced by advancing the pressure plate of the PRESSMIXER until the back pressure reached 70 bar. The blade was then moved axially throughout the entire volume of the mixing chamber for 30 seconds, after which the pressure plate was retracted. Following retraction, mixing continued for 2 minutes to cool the charge. During the cooling phase, the blade was moved axially through the entire volume of the mixing chamber.

At the end of the last dispersing cycle, 65 g of vinyl oximinosilane ("VOS" available from Allied-Signal Corp.) and 100 g of a non-hydroxy terminated polydimethylsiloxane polymer (Masil SF polymer from PPG Industries, Inc. having a viscosity of 60,000 centistokes) were stirred together and spread over the surface of the mixing chamber contents, where they were then mixed into the contents under vacuum using a 10 min. non-pressurized mixing cycle.

Next, 10 g of an adhesion promoter ("Y11542" from OSI Chemicals Inc.) was spread over the surface of the mixing chamber contents and mixed into the contents under vacuum using a 10 min. non-pressurized mixing cycle. The mixer contents were then subjected to 3 pressurized dispersing cycles (30minutes under vacuum at 70 bar, followed by a non-pressurized cool-down mix cycle lasting 3 minutes).

At the end of the dispersing operation, a final 150 g charge of fumed silica (Cabosil TS610 from Cabot Corp.) was added to the mixer contents and incorporated therein by mixing for 10 minutes, degassing for 10 minutes, and dispersing by means of 3 pressurized dispersing cycles (with 3 minute cool-down periods between each cycle). The resulting sealing composition had a tacky, dough-like consistency. It was packed into 1 liter cans and then stored under nitrogen.

Examples 2–24 were prepared according to the above-described procedure. A summary of the sealing compositions according to these Examples, as well as Example 1, is found in Table I. All amounts are given in weight percent. The properties of sealing compositions according to Examples 1–24 (determined according to the above-described test protocols) are set forth in Table II.

TABLE I

| | Mixer Formulations | | | | | | | |
|---|---|---|---|---|---|---|---|---|
| Example | Type of OH Silicone | Amount of OH Silicone | Fumed Silica TS610 | VOS | Type of Adhesion Promoter | Amount of Adhes. Promoter | Type of Non OH Silicone | Amount of Non OH Silicone |
| 1 | SFR 150,000 | 71.0 | 22.0 | 2.6 | Y11542 | 0.40 | SF 60,000 | 4.0 |
| 2 | SFR 150,000 | 71.0 | 22.0 | 2.6 | A1120 | 0.40 | SF 60,000 | 4.0 |
| 3 | SFR 150,000 | 71.4 | 22.0 | 2.3 | A1120 | 0.28 | SF 60,000 | 4.0 |
| 4 | SFR 150,000 | 72.0 | 21.0 | 2.6 | Y11542 | 0.40 | SF 60,000 | 4.0 |
| 5 | SFR 150,000 | 73.0 | 20.0 | 2.6 | Y11542 | 0.40 | SF 60,000 | 4.0 |
| 6 | SFR 150,000 | 78.1 | 18.9 | 3.0 | None | None | None | None |
| 7 | SFR 150,000 | 69.8 | 19.0 | 3.0 | Y11343 | 0.46 | SF 2010 | 7.7 |
| 8 | SFR 150,000 | 69.7 | 19.3 | 2.9 | A1120 | 0.39 | VDV 20,000 | 7.7 |
| 9 | SFR 150,000 | 69.7 | 19.3 | 2.9 | Y11343 | 0.39 | VDV 20,000 | 7.7 |
| 10 | SFR 150,000 | 69.7 | 19.3 | 2.9 | Y11597 | 0.39 | VDV 10,000 | 7.7 |
| 11 | SFR 150,000 | 69.7 | 19.3 | 2.9 | Y11542 | 0.39 | VDV 10,000 | 7.7 |
| 12 | Blnd 110,000 | 72.0 | 21.0 | 2.6 | Y11542 | 0.40 | SF 60,000 | 4.0 |
| 13 | Blnd 98,800 | 71.0 | 22.0 | 2.6 | Y11542 | 0.40 | SF 60,000 | 4.0 |
| 14 | SFR 80,000 | 71.0 | 22.0 | 2.6 | Y11542 | 0.40 | SF 60,000 | 4.0 |
| 15 | SRF 80,000 | 57.6 | 25.0 | 3.0 | A1120 | 0.40 | SF 60,000 | 14.0 |
| 16 | SRF 80,000 | 54.6 | 22.0 | 3.0 | A1120 | 0.40 | SF 60,000 | 20.0 |
| 17 | SRF 18,000 | 60.6 | 22.0 | 3.0 | A1120 | 0.40 | SF 60,000 | 14.0 |
| 18 | SRF 18,000 | 57.6 | 25.0 | 3.0 | A1120 | 0.40 | SF 60,000 | 14.0 |
| 19 | SFR 2,000 | 70.6 | 22.0 | 3.0 | Y11542 | 0.40 | SF 60,000 | 4.0 |
| 20 | SFR 2,000 | 68.6 | 24.0 | 3.0 | Y11542 | 0.40 | SF 60,000 | 4.0 |
| 21 | SFR 2,000 | 57.6 | 25.0 | 3.0 | A1120 | 0.40 | SF 60,000 | 14.0 |
| 22 | SFR 2,000 | 55.6 | 27.0 | 3.0 | A1120 | 0.40 | SF 60,000 | 14.0 |
| 23 | SFR 300,000 | 76.2 | 17.0 | 2.4 | A1120 | 0.40 | SF 60,000 | 4.0 |
| 24 | SFR 300,000 | 72.7 | 20.8 | 2.2 | A1120 | 0.28 | SF 60,000 | 4.0 |

Y11542 is gamma-ureidopropyltrimethoxysilane available from OSI Chemicals, Inc.
A1120 is N-beta-(aminoethyl)-gamma-aminopropyltrimethoxysilane available from OSI Chemcials, Inc.
Y11343 is amino-organofunctional silane available from OSI Chemcials, Inc.
Y11597 is isocyanurate trimethoxysilane available from OSI Chemicals, Inc.
VDV 20,000 and 10,000 are vinyl terminated polyidmethylsiloxanes available from Applied Silicones, Inc. Ventura, CA
Blend 110,00 is a blend of Masil SFR 150,000 and Masil 80,000 available from PPG Industries
Blend 98,800 is a blend of Masil SFR 150,000 and Masil 80,000 available from PPG Industries

TABLE II

Test Results

| Examples | Tack | Stretch | End-Seal | Tensile (KPa) | % Elong | Durom. (Shore A) | Shear Adh. (KPa) | G' (0.1) (KPa) | G" (0.1) (KPa) | G' (100) (KPa) | G" (100) (KPa) |
|---|---|---|---|---|---|---|---|---|---|---|---|
| 1 | Pass | Pass | Pass | 3570 | 425 | 42 | 648 | 44.4 | 23.9 | 270 | 120 |
| 2 | Pass | Pass | Pass | 2470 | 339 | 41 | 1820 | 99.6 | 47.4 | 423 | 159 |
| 3 | Pass | Pass | Pass | 2220 | 304 | 36 | 1260 | 93.2 | 45.5 | 358 | 144 |
| 4 | Pass | Pass | Pass | 3360 | 413 | 41 | 599 | 62.4 | 34.2 | 326 | 136 |
| 5 | Pass | Pass | Pass | 3070 | 395 | 41 | 772 | 35.0 | 22.1 | 183 | 105 |
| 6 | Fail | NT | Fail | NT | NT | NT | NT | NT | NT | NT | NT |
| 7 | Fail | Pass | Pass | 2890 | 341 | 39 | 517 | NT | NT | NT | NT |
| 8 | Pass | Pass | Pass | 1300 | 186 | NT | 1688 | NT | NT | NT | NT |
| 9 | Pass | Pass | Pass | NT | NT | NT | 909 | NT | NT | NT | NT |
| 10 | Pass | Pass | Pass | 2730 | 346 | 38 | 675 | NT | NT | NT | NT |
| 11 | Pass | Pass | Pass | NT | NT | NT | 909 | NT | NT | NT | NT |
| 12 | Fail | Fail | Fail | NT | NT | NT | NT | 58.6 | 34.5 | 261 | 113 |
| 13 | Pass | Pass | Pass | 3070 | 389 | 45 | NT | 72.0 | 46.3 | 350 | 129 |
| 14 | Pass | Fail | Pass | 2470 | 339 | 39 | NT | 62.4 | 39.4 | 325 | 143 |
| 15 | Pass | Pass | Pass | 3020 | 248 | NT | NT | NT | NT | NT | NT |
| 16 | Fail | NT | NT | NT | NT | NT | NT | NT | NT | NT | NT |
| 17 | Fail | NT | NT | NT | NT | NT | NT | NT | NT | NT | NT |
| 18 | Pass | Pass | Pass | NT | NT | NT | NT | NT | NT | NT | NT |
| 19 | Fail | NT | NT | NT | NT | NT | NT | NT | NT | NT | NT |
| 20 | Pass | NT | NT | NT | NT | NT | NT | NT | NT | NT | NT |
| 21 | Pass | Pass | Pass | NT | NT | NT | NT | NT | NT | NT | NT |
| 22 | Fail | NT | Fail | NT | NT | NT | NT | NT | NT | NT | NT |
| 23 | Fail | Fail | Fail | 1920 | 470 | 32 | 2380 | 10.7 | 4.17 | 97.3 | 64.7 |
| 24 | Pass | Pass | Pass | 1840 | 318 | 32 | 723 | NT | NT | NT | NT |

NT means Not Tested

Portions of the compositions prepared according to Examples 1 and 4 were further subjected to a variety of immersion tests described below. Prior to testing, each composition was cured. The composition according to Example 1 was cured for 3 days at 25° C./50% relative humidity, while the composition according to Example 4 was cured for 7 days at 25° C./50% relative humidity.

Immersion Test No. 1

The cured sample was immersed in ASTM#3 oil (available from R. E. Carroll, Inc. of Trenton, N.J.) at 150° C. for 70 hours, after which the tensile strength, elongation, and Shore A hardness were measured.

In the case of Example 1, the cured composition exhibited a tensile strength of 1,730 KPa, an elongation of 323%, and a Shore A hardness of 17.

In the case of Example 4, the cured composition exhibited a tensile strength of 1,350 KPa, an elongation of 428%, and a Shore A hardness of 18.

Immersion Test No. 2

The cured sample was immersed in motor oil (Amoco SAE 10W30 motor oil available from Amoco Corp.) at 150° C. for 14 days, after which the tensile strength, elongation, and Shore A hardness were measured.

In the case of Example 1, the cured composition exhibited a tensile strength of 868 KPa, an elongation of 602%, and a Shore A hardness of 14. Example 4 was not tested.

Immersion Test No. 3

The cured sample was immersed in a 50/50 weight % mixture of ethylene glycol/water at 121° C. for 14 days, after which the tensile strength, elongation, and Shore A hardness were measured.

In the case of Example 1, the cured composition exhibited a tensile strength of 3,160 KPa, an elongation of 557%, and a Shore A hardness of 33. Example 4 was not tested.

Examples 25–26

Sealing compositions were prepared using a co-rotating, intermeshing, twin-screw extruder manufactured by Teledyne Readco, Inc. The extruder had a diameter of 50 mm and a length to diameter ratio of 10:1. The particular composition for each Example in set forth in Table III. All amounts are given in weight percent.

Except where indicated in Table III, the extruder barrel was cooled to a temperature of −15° C. The hydroxy-terminated polydialkyl siloxane polymer and fumed silica were added at the feed section of the extruder by pumping the siloxane polymer to the extruder using a Zenith external gear pump, and adding the fumed silica using a gravimetric feeder.

The siloxane polymer/silica mixture was conveyed 7.5 cm down the screw of the extruder to a first mixing section consisting of a 4 cm section of paddles oriented at 45° where the non-hydroxy terminated polydialkyl siloxane polymer was added using a Zenith external gear pump. The mixture then passed into a 5 cm section, where four paddles oriented at 90° provided intense mixing, after which the material was conveyed through a 5 cm low pressure zone.

Next, the sealing composition entered a second mixing zone measuring 8 cm having a configuration similar to that of the first mixing zone where the low viscosity silane mixture (cross-linker and adhesion promoter) was thoroughly mixed into the silica/hydroxy-terminated polydialkyl siloxane polymer paste. The resulting composition was then pumped out of the extruder through a 10 cm conveying section. After steady state operating conditions had been achieved, the material exiting the extruder was collected in 1 liter plastic bags, and then stored under nitrogen until further use.

Examples 27–29

The procedure used to make the sealant of Examples 27–29 was the same as that of Examples 25 & 26 with the following exceptions:

1.) The silane mixture (crosslinker and adhesion promoter) was added at the feed section of the extruder. The sequential order of addition of material to adjacent flights of the co-rotating screws was hydroxy-terminated poly (dimethyl siloxane), fumed silica, silane mixture.

2.) A vacuum vent port was added to the extruder barrel at the end of the first mixing zone to allow removal of air from the mixture. The addition of the vent port necessitated some modification of the screw. A blister element was added to the screw assembly in the region just before the vent port to improve the seal at the screw/vent port interface. The conveying screw section was lengthened to 10 centimeters. The second mixing section (of the first mixing zone) was modified so that it consisted of a 1 centimeter section of 45° forwarding paddles, followed by a 3 centimeter section of 90° paddles. Following these modifications, the vacuum was able to be increased to 71 centimeters of mercury. A 3 centimeter section of 45° reversing paddles was also added to the second mixing zone to improve the seal between the vent port and the outlet.

The properties of sealing compositions according to Examples 27–29 (determined according to the above-described test protocols) are set forth in Table IV.

-continued

| Auto Type | Sealant of Example |
|---|---|
| 1986 Bronco II | 3 |
| 1984 Buick Riviera 5.0 L V-8 | 9 |
| 1985 Chevrolet Cavalier - 4 cyl | 11 |

A strip prepared accordingly to Example 3 was also applied as a sealant on the manifold rails of a 1985 Buick Park Avenue 3.6 L V-6. A strip prepared according to Example 9 was applied as a thermostat gasket in a Cummins diesel dynamometer engine. In each case, the parts were re-assembled following application and the engine started immediately. In the case of the diesel engine, 15 psi of internal pressure was generated within 15 min. of applying the sealing strip.

Example 31

A 1982 Honda Accord with an oil leak between the transmission and the engine was repaired from the outside of

TABLE III

Example Teledyne Extruder Formulations

| Example | Type of OH Silicone | Amount of OH Silicone | Type of Fumed Silicone | Fumed Silicone | VOS | Type of Adhesion Promoter | Amount of Adhes. Promoter | Type of Non OH Silicone | Amount of Non OH Silicone | MQ Silicone Resin (type) (amount) |
|---|---|---|---|---|---|---|---|---|---|---|
| 25 | SFR 150,000 | 68.4 | TS610 | 23.2 | 2.9 | Y11542 | 0.42 | SF 60,000 | 5.1 | None |
| 26 | SFR 150,000 | 67.8 | TS610 | 23.1 | 3.5 | Y11542 | 0.50 | SF 60,000 | 5.1 | None |
| 27 | SFR 150,000 | 68.7 | R974V | 22.0 | 3.6 | Y11542 | 0.51 | SF 1,000 | 2.6 | SR 54 2.6 wt % |
| 28 | SFR 150,000 | 67.8 | R974V | 23.0 | 3.6 | Y11542 | 0.51 | SF 60,000 | 5.1 | None |
| 29 | SFR 150,000 | 68.0 | R974V | 22.0 | 4.4 | Y11542 | 0.63 | SF 60,000 | 5.0 | None |

TABLE IV

Test Results-Teledyne Extruder

| Examples | Tack | Stretch | End-Seal | Tensile (KPa) | % Elong | Durom. (Shore A) | Shear Adh. (KPa) | G' (0.1) (KPa) | G" (0.1) (KPa) | G' (100) (KPa) | G" (100) (KPa) |
|---|---|---|---|---|---|---|---|---|---|---|---|
| 25 | Pass | Pass | Pass | 3390 | 360 | 41 | 814 | NT | NT | NT | NT |
| 26 | Fail | Fail | Fail | 3720 | 398 | 44 | 1320 | NT | NT | NT | NT |
| 27 | Pass | Pass | Pass | 3540 | 400 | 53 | 725 | 58.1 | 36.3 | 228 | 149 |
| 28 | Pass | Pass | Pass | 2940 | 289 | 52 | 814 | 68.7 | 42.2 | 228 | 146 |
| 29 | Fail | Fail | Pass | 3320 | 351 | 54 | 1010 | 159 | 102 | 356 | 221 |

A portion of the sealing composition prepared according to Example 27 was cured for 7 days at 25° C./50% relative humidity, and then subjected to Immersion Test No. 1, supra. Following the immersion test, the cured sample exhibited a tensile strength of 1,950 KPa, an elongation of 281%, and a Shore A hardness of 23.

Example 30

Silicone sealing strips measuring 6 mm in diameter were applied as valve cover gaskets as follows:

| Auto Type | Sealant of Example |
|---|---|
| 1980 Chrysler Omni Horizon | 8 |
| 1986 Bronco II | 8 | the engine without disassembling the engine. First, the area surrounding the leak was thorough cleaned with an engine degreaser. A 6 mm diameter silicone strip according to Example 1 was pressed by hand along the seam that was leaking. The engine was started immediately. The leak rate had decreased to 1–2 drops over a 24 hour period.

Other embodiments are within the following claims.

What is claimed is:

1. A moisture-curable silicone sealing composition comprising:
   a hydroxy-terminated polydialkylsiloxane;
   fumed silica;
   a silane crosslinking agent; and
   an adhesion promoter;
   wherein the moisture-curable silicone sealing composition is characterized by having a storage shear modulus of at least 9.0 kilopascals and a loss shear modulus of at least 4.0 kilopascals prior to curing when measured at 25°±1° C. at a frequency of 0.1 radian per second, said composition being tacky and self-supporting at room temperature prior to curing.

2. The sealing composition of claim 1, wherein said composition has a storage shear modulus of at least 80 KPa and a loss shear modulus of at least 50 KPa prior to curing when measured at 25°±1° C. at a frequency of 100 rad/sec.

3. The sealing composition of claim 1, wherein said composition has a viscosity of at least 98.5 KPa Sec prior to curing when measured at 25°±1 ° C. at a frequency of 0.1 rad/sec.

4. The sealing composition of claim 1, wherein said composition has a viscosity of at least 940 Pa Sec prior to curing when measured at 25°±1° C. at a frequency of 100 rad/sec.

5. The sealing composition of claim 1, wherein said composition is provided in the form of a ribbon, rope, or sheet.

6. The sealing composition of claim 1, wherein said composition has an elongation value of about 200% to about 1200% after curing.

7. The sealing composition of claim 1, wherein said fumed silica having a surface area of at least 50 m$^2$/g.

8. The sealing composition of claim 1, wherein said fumed silica having a surface area ranging from about 130 m$^2$/g to about 400 m$^2$/g.

9. The sealing composition of claim 1, wherein said composition comprises:
  (a) 35–85% by wt. of said hydroxy-terminated polydialkylsiloxane;
  (b) 5–30% by wt. of said fumed silica;
  (c) 1–15% by wt. of said silane crosslinking agent; and
  (d) 0.46% by wt. or less of said adhesion promoter.

10. The sealing composition of claim 1, wherein said polydialkylsiloxane is present in an amount ranging from about 65% to about 75% by wt.

11. The sealing composition of claim 1, wherein said fumed silica is present in an amount ranging from about 20% to about 25% by wt.

12. The sealing composition of claim 1, wherein said silane crosslinking agent is present in an amount ranging from about 2.5% to about 6% by wt.

13. The sealing composition of claim 1, wherein said composition is essentially free of curing catalysts.

14. The sealing composition of claim 1, wherein the adhesion promoter is an alkoxysilane.

15. The sealing composition of claim 14 wherein the adhesion promoter is an alkoxysilane selected from the group consisting of methyltrimethoxysilane, vinyltrimethoxysilane, gamma-glycidoxypropylmethyldiethoxysilane, and gamma-mercaptopropyltrimethoxysilane.

16. The sealing composition of claim 1, wherein the adhesion promoter is present in an amount ranging from about 0.28% to about 0.46% by wt.

17. A method of sealing a first surface and a second surface together comprising the steps of:
  (a) applying to said first surface a moisture-curable silicone sealing composition comprising
    a hydroxy-terminated polydialkylsiloxane;
    fumed silica;
    a silane crosslinking agent; and
    an adhesion promoter; wherein the moisture-curable silicone sealing composition is characterized by having a storage shear modulus of at least 9.0 kilopascals and a loss shear modulus of at least 4.0 kilopascals prior to curing when measured at 25°±1° C. at a frequency of 0.1 radian per second, said composition being tacky and self-supporting at room temperature prior to curing; and
  (b) contacting said first surface to which said sealing composition has been applied with said second surface in the presence of moisture to bond said first surface to said second surface.

* * * * *

UNITED STATES PATENT AND TRADEMARK OFFICE
CERTIFICATE OF CORRECTION

PATENT NO. : 6,471,820 B1
DATED : October 29, 2002
INVENTOR(S) : Paulick, Leora M.

It is certified that error appears in the above-identified patent and that said Letters Patent is hereby corrected as shown below:

Column 2,
Lines 16 and 18, "infra" should be -- *infra* --.
Line 56, "a-particular application." should be -- a particular application --.

Column 3,
Line 12, "failing" should be -- falling --.
Line 18, "in situ" should be -- *in situ* --.
Line 39, "having a bulk density o 120 g/l" should be -- having a bulk density of 120 g/l --.
Line 51, "crosslinlding" should be -- crosslinking --.

Column 4,
Line 60, "10L NK PRESSMXER" should be -- 10L NK PRESSMIXER --.

Column 5,
Line 16, "Tests B, P, and G were performed on" should be -- Tests B, F. and G were performed on --.

Column 8,
Table I, "Mixer Formulations" should be -- Press-Mixer Formulations --.

Column 10,
Line 32, "for each Example in set forth in Table III." should be -- for each Example is set forth in Table III. --.

Column 11,
Line 52, "Immersion Test No. 1, supra." should be -- Immersion Test No. 1, *supra*. --.

UNITED STATES PATENT AND TRADEMARK OFFICE
CERTIFICATE OF CORRECTION

PATENT NO. : 6,471,820 B1
DATED : October 29, 2002
INVENTOR(S) : Paulick, Leora M.

It is certified that error appears in the above-identified patent and that said Letters Patent is hereby corrected as shown below:

<u>Column 12,</u>
Line 51, "thorough" should be -- thoroughly --.

Signed and Sealed this

Twenty-seventh Day of May, 2003

JAMES E. ROGAN
*Director of the United States Patent and Trademark Office*